United States Patent [19]

Vanderveer et al.

[11] Patent Number: 4,624,856
[45] Date of Patent: * Nov. 25, 1986

[54] METHOD AND COMPOSITION FOR SOFT EDIBLE BAKED PRODUCTS HAVING IMPROVED EXTENDED SHELF-LIFE AND AN EDIBLE FIRM GEL FOR USE THEREIN

[75] Inventors: Fred Vanderveer, Mahwah; Aloysius Knipper, Ringwood; Robert Straka, Pequannock; Alex J. Squicciarini, Fair Lawn, all of N.J.

[73] Assignee: Nabisco Brands, Inc., Parsippany, N.J.

[*] Notice: The portion of the term of this patent subsequent to Apr. 24, 2001 has been disclaimed.

[21] Appl. No.: 712,206

[22] Filed: Mar. 15, 1985

Related U.S. Application Data

[63] Continuation of Ser. No. 580,365, Feb. 15, 1984, abandoned, which is a continuation-in-part of Ser. No. 293,924, Aug. 18, 1981, Pat. No. 4,444,799.

[51] Int. Cl.$^4$ .................. A21D 10/00; A23L 1/04
[52] U.S. Cl. .................. 426/549; 426/573; 426/575; 426/653; 426/658; 426/331
[58] Field of Search .......... 426/549, 573, 575, 331, 426/321, 560, 555, 653, 658

[56] References Cited

U.S. PATENT DOCUMENTS

| | | | |
|---|---|---|---|
| 2,400,834 | 5/1946 | Le Gloahee | 536/3 |
| 2,786,763 | 3/1957 | Rivoche | 426/575 |
| 2,786,764 | 3/1957 | Rivoche | 426/92 |
| 2,791,508 | 5/1957 | Rivoche | 426/550 |
| 2,859,115 | 11/1958 | Rivoche | 426/575 |
| 3,119,697 | 1/1964 | Leo et al. | 426/575 |
| 3,342,612 | 9/1967 | Foster et al. | 426/575 |
| 3,352,688 | 11/1967 | Messina | 426/575 |
| 3,362,831 | 1/1968 | Szczesniak | 426/104 |
| 3,386,921 | 6/1968 | Sweiger et al. | 252/315.3 |
| 3,480,450 | 11/1969 | Rocks et al. | 426/231 |
| 3,493,382 | 2/1970 | Ryan et al. | 426/573 |
| 3,503,769 | 3/1970 | McDowell | 106/208 |
| 3,640,741 | 2/1972 | Etes | 106/170 |
| 3,650,766 | 3/1972 | Smadar | 426/89 |
| 3,656,967 | 4/1972 | Barton et al. | 426/275 |
| 3,892,870 | 7/1975 | Wood | 426/573 |
| 3,892,871 | 7/1975 | Cooper | 426/573 |
| 3,922,360 | 11/1975 | Sneath | 426/573 |
| 4,117,172 | 7/1978 | Bradshaw et al. | 426/276 |
| 4,119,739 | 10/1978 | Barwick et al. | 426/573 |
| 4,146,652 | 3/1979 | Kahn et al. | 426/564 |
| 4,344,969 | 8/1982 | Youngquist et al. | 426/18 |
| 4,347,261 | 8/1982 | Challen et al. | 426/575 |
| 4,348,418 | 9/1982 | Smith et al. | 426/104 |
| 4,455,333 | 6/1984 | Hong | 426/94 |

FOREIGN PATENT DOCUMENTS

| | | |
|---|---|---|
| 2420622 | 11/1975 | Fed. Rep. of Germany . |
| 2268476 | 11/1975 | France . |
| 2274222 | 1/1976 | France . |
| 2241183 | 3/1976 | France . |
| 1579324 | 11/1980 | United Kingdom . |

*Primary Examiner*—Raymond N. Jones
*Assistant Examiner*—Elizabeth A. King
*Attorney, Agent, or Firm*—Richard Kornutik

[57] ABSTRACT

Soft cookies, biscuits, snacks and the like, are produced from a specially formulated and prepared dough. The soft edible products retain their fresh baked, moist, tender texture for extended periods of time. A firm gel, capable of being ground, is formed from: (a) a viscous liquid, e.g., a corn syrup, (b) a gum, e.g., an alginate gum, (c) an optional humectant and dispersing agent for the gum, e.g., glycerine, (d) a calcium ion source for gelling the gum, and (e) an optional humectant and dispersing agent for the calcium ion source, e.g., propylene glycol, using high shear mixing. The ground gel is incorporated into the cookie or other dough prior to baking.

41 Claims, No Drawings

METHOD AND COMPOSITION FOR SOFT EDIBLE BAKED PRODUCTS HAVING IMPROVED EXTENDED SHELF-LIFE AND AN EDIBLE FIRM GEL FOR USE THEREIN

RELATED APPLICATIONS

This application is a continuation of U.S. application Ser. No. 580,365, filed Feb. 15, 1984, now abandoned, which in turn is a continuation-in-part of U.S. Ser. No. 293,924, filed Aug. 18, 1981, now U.S. Pat. No. 4,444,799.

FIELD OF THE INVENTION

This invention relates to a composition or formulation and a process by which a relatively neutral-flavor gel ingredient is produced and incorporated in a base dough for the preparation of soft, edible, baked products, especially soft cookies in varieties such as chocolate chip, peanut butter, molasses, etc., the soft, edible, baked products having a surprisingly long and extended shelf life.

More particularly, the preferred raw materials, utilized to prepare the neutral-flavor gel, in proportions and in a manner described in greater detail hereinafter, comprise a high-fructose corn syrup, an alginate gum, and calcium sulfate dihydrate. High shear mixing of the gel ingredients assures the attainment of a substantially homogeneous, lump-free gel which is suitable for grinding.

BACKGROUND OF THE INVENTION

Traditionally, adequate moisture, softness and freshness have been retained in soft cookies and snacks through the use of ground raisins or other fruit pastes incorporated into the dough. These materials, however, impart a fruity taste to the dough that is acceptable in oatmeal-apple, or raisin flavored cookies, for example, but is not appropriate for soft chocolate chip, peanut butter, molasses or other varieties of soft, non-fruit tasting cookies, snacks and the like.

It is, therefore, among the primary objects of the invention to provide a suitable replacement or substitute for ground fruits or fruit pastes that has the desired properties of bland flavor, high moisture retention properties in baked products, compatibility with dough mixing and handling processes, and costs comparable to the prior art fruit pastes.

It is another object of this invention to provide a firm gel system, which is shelf-stable in character and which can be stored in sealed shipping units for indefinite periods of time and later distributed to baking locations or plants for production of soft-textured cookies, biscuits, snacks and the like.

Edible gel formulations are known in the art, but they are usually based on an aqueous system and used for filling baked products, for example, jelly-filled doughnuts and jelly rolls. U.S. Pat. No. 3,352,688, describes an aqueous-based light bodied gel containing a water-soluble alginate which is said to be free from gumminess and is heat- and freeze-resistant. Typical of the prior art, this teaching relates only to the filling utilized in baked goods, and not to the preparation of a soft-textured, moisture-retaining, cookie dough.

German patent publication No. DE-A2,420,622 and corresponding French patent No. 2268476 teach a gel composition for use as a coating or topping or filling for baked goods which gel quickly and quickly become firm enough for cutting. The base mass of the gel consists of a mixture of 25 to 55 parts by weight of sodium alginate, 0 to 30 parts by weight sodium hexameta phosphate and either 3 to 10 parts by weight calcium hydrogen phosphate or 5 to 20 parts by weight calcium citrate. Production of a grindable firm gel which is incorporated into a dough for producing soft-textured baked products is not taught or suggested.

In another teaching, typical of the prior art, U.S. Pat. No. 3,342,612 discloses dessert gels which have the capacity to gel at room temperatures. This is said to be of particular advantage in tropical or subtropical, low income regions where refrigeration often is not available. Once again, the gel is based on an aqueous system, which in this instance utilizes carrageenin to prepare the dessert gel.

U.S. Pat. No. 3,892,871 discloses that the use of corn syrup as substantially the only sugar or the use of corn syrup of higher fructose content than normal instead of just a mixture of sucrose and water and/or fruit juice improves the properties of jellies. The jellies are taught as having improved appearance, mouthfeel, and spreadability on bread or fragile crackers. The jellies comprise corn syrup, a flavoring material such as a natural flavor or fruit or vegetable juice, a polysaccharide or proteinaceous gelling agent including edible gums, an acidifying agent and an optional preservative or adjuvant. However, production of a grindable gel for producing soft-textured baked goods in not taught or suggested by the reference.

Another aspect of applicants' invention involves the use of a humectant such as glycerine in the preparation of the gel system. Humectants, of course, have long been used in the food industry, and more particularly in the preparation of baked goods. One such teaching relevant to this point is U.S. Pat. No. 3,656,967, believed to cover the familiar "Pop-Tart" dessert or breakfast items. Typically they comprise a fruit-filled product, adapted to be heated in a common toaster oven for one to two minutes. Heating produces the desired eating quality wherein the filling softens to a plastic or gelled condition and the crust has a crisp fresk-baked texture. A hydrophilic agent or humectant, such as glycerine or sorbitol in the filling retains moisture in the filling. There is no teaching of incorporating the humectant into a grindable gel composition for use in a dough.

In U.S. Pat. No. 3,493,382, a molded edible product (e.g., for a childs's toy) may contain carrageenen to bind and/or gel a system containing glycerol and/or propylene glycol. Edible products are capable of being produced at quite relatively low baking temperatures, for example 195° F. to 200° F. This enables provision of an edible product which a child user may readily make with safety. Industrial, high-volume production of soft-textured cookies having an extended shelf-life contemplated by the present invention is not taught by the patent.

In U.S. Pat. No. 3,119,697, stabilized icings are prepared using an agar or modified agar gelling agent in an aqueous system. This reference does not teach or suggest how to make soft-textured, baked cookie products having extended shelf-life as contemplated by the present invention.

U.S. Pat. Nos. 3,362,831, 4,146,652, and 4,344,969 relate to imparting softness to edible food products. However, none of these three references teach or suggest the production of a firm gel which is capable of being ground for producing soft-textured baked goods.

U.S. Pat. No. 3,362,831 discloses the production of artificial fruits and vegetables by contacting an aqueous sol of a water soluble alginate salt with a solution containing edible alkaline earth metal ions to form an insoluble alginate film at the interface of the two solutions. Additives, such as corn syrup sweeteners, may be incorporated in the alginate sol prior to contact with the alkaline earth metal solution. Corn syrup sweeteners, it is taught, have a significant softening effect on vegetable textures without influencing their crunchiness.

U.S. Pat. No. 4,146,652 discloses intermediate-moisture foods which remain ready to use at freezer temperatures. The food products comprise about from 15 to 45% water, sugar in a ratio to water of about from 1:1 to 2:1, about from 2.5 to 30% fat, and minor, but effective amounts of salt, emulsifier, stabilizer and flavoring. The product is spoonable at about 10° F. Vegetable or synthetic gums are disclosed as stabilizers which improve the body and texture of toppings and as aiding in providing freeze-thaw stability. Diols and polyols, such as propylene glycol and glycerol are disclosed as assisting in maintaining the foods in a bacteria-, yeast-, and mold-free state while providing softness or plasticity to the formulations.

U.S. Pat. No. 4,344,969 discloses that cookies can be formulated to be soft and moist by high shortening and/or high water formulas or by the addition of fructose. See column 2, lines 35–47. The patent teaches incorporation of a carbohydrase into a cookie dough followed by a special baking process provides a cookie having a storage-stable texture which is crisp on the outside and soft on the inside.

Great Britain Pat. No. 1,579,324 discloses a gelled pet food of intermediate moisture content which contains sufficient water-soluble preservative to reduce the water activity to a level at which the product is bacteriologically stable. Sucrose, sodium chloride, glycerin, propylene glycol and corn syrup are taught as solutes for water activity reduction. The food product also contains sodium alginate or another alginic acid derivative which is cross-linked to a gel by di- or multivalent cations, such as calcium ions. The rate of release of cross-linking cations is controlled by using a sparingly soluble source of calcium or by the addition of a slowly soluble acid to release calcium ions from an otherwise insoluble calcium salt.

In one embodiment, a high speed mixer is used to admix a fumaric acid solution with a cooled mass of the remaining ingredients of a meat-like pet food to minimize initial gel breakdown by mechanical action. The resulting mixture is then shaped or cut into strands or pieces having a meat-like appearance. Use of high shear mixing of the calcium ion source or alignate to avoid the initial formation of lumps is not taught or suggested. Furthermore, production of an edible firm gel which is capable of being ground for producing soft-textured baked goods is not taught or suggested by the British patent.

The present invention provides a process for preparing an edible firm gel which is capable of being ground, typically at temperatures of from about 65° F. to about 85° F., which is at least substantially lump-free and at least substantially homogeneous. High-shear mixing of the gel ingredients assures the attainment of at least a substantially lump-free homogeneous gel composition in an exceptionally short period of time. The period of time for the gel composition to firm, however, is sufficiently long so as to permit its removal from mixing vessels and to permit packaging of it for shipment to bakeries and the like. The gel is ground into pieces which are sufficiently small so as to be non-discernable as pieces by the consumer during consumption of the baked goods to which they impart soft eating qualities.

SUMMARY OF THE INVENTION

A firm humectant gel, or dough conditioner, is obtained by admixing: (a) an edible viscous liquid which functions primarily as a humectant, (b) an edible gum capable of being gelled or set by calcium ions, which is used primarily to gel the system, and (c) an edible calcium salt which is used to control the rate of gelling of the system. The ingredients are admixed under high shear mixing conditions which assures an at least substantially lump-free and homogeneous gel. Mixing times needed to achieve a substantially lump-free homogeneous gel are considerably shorter than those encountered with the use of conventional low shear paddle-type mixers or stirrers.

In the process of the present invention the edible viscous liquid is subjected to high shear mixing and the edible gum and calcium ion source are added preferably sequentially to the agitated edible viscous liquid. The mixing is continued until at least substantial homogeneity is achieved. Clumping, or the formation of local concentrations of particulate, or powdered gums and calcium salts which tends to occur upon their contact with the edible viscous liquid is avoided or at least short-lived due to agitation caused by the high shear mixing. Dispersing agents for the edible gum and/or calcium ion source can be used to prolong gelation times or to enhance the humectant properties of the gel.

The edible firm, elastic or rubbery gel is ground into pieces typically at temperatures of from about 65° F. to about 85° F. The ground gel is incorporated into a dough using conventional mixing techniques known in the bakery art. The humectant gels of the present invention have a water activity of less than about 0.9, preferably less than about 0.7 and have a shelf stability of at least about six months in soft-textured baked goods. The ground gel which is incorporated into the dough is not discernable as pieces in the baked good upon consumption.

The gel composition comprises: (a) from about 0.25 parts by weight to about 4.0 parts by weight, preferably from about 0.5 parts by weight to about 1.5 parts by weight of an edible gum capable of being set by calcium ions, and (b) from about 0.1 parts by weight to about 4 parts by weight, preferably from about 0.25 parts by weight to about 1.0 parts by weight of a calcium ion source, said parts by weight being based upon 100 parts by weight of the edible viscous liquid. The optional edible dispersing agent for the gum can be present in an amount of up to about 10 parts by weight, based upon 100 parts by weight of the edible viscous liquid. The edible dispersing agent for the calcium ion source can be used in amounts up to about 10 parts by weight, based upon 100 parts by weight of the edible viscous liquid. The firm humectant gels of the present invention are used in amounts of from about 2% to about 50% by weight, based upon the weight of the dough for the production of soft textured baked goods. Baked goods of the present invention have soft textural stability for at least about six months.

DETAILED DESCRIPTION OF THE INVENTION

The edible viscous liquid functions primarily as a humectant. Gels produced using edible viscous liquids exhibit substantially lower water activities than do gels produced using water alone or other low viscosity liquids. The lower the water activity of the gel, the longer it can be stored for subsequent use in the production of baked goods. The water activity of the gels of the present invention are suitably less than about 0.9, preferably less than about 0.7. Antimicrobial agents or anti-mycotics can be included in the gel composition to increase stability. Generally, gels which have a water activity of less than about 0.7 exhibit stability for extended periods of time without the need for preservatives. Gels having water activities above about 0.7 should generally be used more rapidly after production or should contain an antimicrobial agent or anti-mycotic. Baking of the dough would lower the water activity of the gel contained in it to provide gels and baked goods having a water activity of less than about 0.7.

The use of edible viscous liquids having a water activity of less than or equal to 0.7 will assure the attainment of a gel which exhibits a water activity of less than or equal to 0.7 over extended periods of time when: (1) stored in containers for subsequent incorporation into baked goods, and (2) when present in soft textured baked goods for periods in excess of six months.

The amount of water used to produce the humectant gels of the present invention should be sufficiently high to permit the edible gum to be set by the calcium ions into a substantially homogeneous gel. The amount of water should be low enough to: (a) avoid gelation which is so rapid as to be incompatible with commercial scale production and (b) assure attainment of a firm, grindable elastic or rubbery gel. Suitable amounts of water generally range from about 15% by weight to about 35% by weight, based upon the total weight of the gel.

The edible viscous liquids which are used in preparing the firm gels of the present invention typically have viscosities of at least about 50 centipoise at 25° C. Suitable edible viscous liquids are high-fructose corn syrup, sucrose syrup, regular-, high-, or low-dextrose corn syrups, honey, molasses, glycerine or any other type of viscous liquid or syrup as will be readily apparent to those skilled in the art. An edible viscous liquid can be used alone or in combination with other edible viscous liquids. A suitable mixture, for example, is a mixture of high fructose corn syrup and sucrose syrup, the amount of high fructose syrup being up to about 10% by weight of the mixture of syrups.

Suitable corn syrups for use in the humectant gels of the present invention have a dextrose equivalent (DE) of about 36 to 71. The dextrose equivalent is defined as the percentage of reducing sugars in the syrup, calculated as dextrose, on a dry weight or dry substance basis, according to the *Handbood of Sugars,* 2nd Edition, Pancoast et al, AVI Publishing Company, Inc., Westport, CT. p. 172 (1980). Suitable high fructose corn syrups which can be used in the shelf stable cookie doughs of the present invention have solids contents of about 68% to about 82% by weight. Sucrose syrups which can be used in the present invention suitably have solids contents of from about 65% to about 70% by weight.

The firm gel system of the present invention is primarily gelled by an edible gum which is capable of being gelled or set by calcium ions. Exemplary of such gums are alginate salts, such as sodium alginate, potassium alginate, and ammonium alginate, carrageenan, guar gum, locust bean gum, starch, protein, mixtures thereof, and the like. An advantage of using an edible gum such as sodium alginate is that it is set chemically by calcium ions. The reaction is not reversible chemically or by the application of heat. Suitable commercially available forms of sodium alginate include Kelcogel HV, Kelcogel LV, and Keltone Gel, each sold by Kelco Division of Merck and Company, Inc., Clark, New Jersey. The amount of edible gum, such as the sodium alginate can vary from about 0.25 to about 4 parts by weight, preferably from about 0.5 to about 1.5 parts by weight, based upon 100 parts by weight of the edible viscous liquid.

When calcium alginate is used as the edible gum, an edible calcium salt is not needed to produce a gel. However, prolonged gelling times normally associated with calcium alginate can be a problem in production situations wherein delays might be experienced in waiting for the mixture to gel before stacking or storing.

The gelling time should be sufficiently long so as to permit evacuation of the processing vessel in which the gel is made, and to permit packaging of the gel into suitable containers for subsequent use in a bakery. The gelling time should be sufficiently short, however, such that the gel becomes grindable into pieces within about 24 hours. Preferably, the gels should be capable of being incorporated into baked goods through an extended shelf life of about six months. The gels should accordingly be acceptably stable against bacteria and mold growth and grindable for periods preferably greater than six months. Precipitation of sugars and formation of a liquid phase may tend to occur after six months, thereby inhibiting grindability of the gel. This type of separation, while undesirable from the standpoint of grindability, occurs to such a small extent, if at all, in the baked goods so as not to impair soft textural stability and microbial stability of the baked goods for periods of at least about six months.

Gelling times are primarily controlled by an edible calcium ion source. Exemplary of suitable calcium ion sources are food grade calcium salts, such as calcium sulfate dihydrate, monocalcium phosphate monohydrate, monocalcium phosphate anhydrous, calcium sulfate, calcium carbonate, calcium lactate, calcium monohydrogen phosphate (dicalcium orthophosphate), dicalcium orthophosphate dihydrate, tricalcium phosphate, mixtures thereof, and the like.

The amount of the calcium ion source should be sufficient to obtain a firm, grindable, elastic or rubbery gel within about 24 hours, preferably within about four hours of the completion of mixing. Excessively long gelling times leads to difficulty in: (a) assuring the attainment of a consistent product and (b) making any necessary formulation changes or processing adjustments to achieve consistency. Additionally, shorter gelling times permit quicker shipping of a product which can be packaged more simply than one which may be subject to spilling. Suitable amounts of the calcium ion source range from about 0.1 parts by weight to about 4 parts by weight, preferably from about 0.25 parts by weight to about 1.0 parts by weight, based upon 100 parts by weight of the edible viscous liquid. The amount is selected to provide the desired gelling time consistent with production procedures. Lower amounts of the edible calcium ion source will increase the gelling time. Increased amounts of the calcium salt will cause the mixture to set or gel more rapidly.

The amount of calcium ion source which is used in the high shear mixing process of the present invention should be as low as practical so as to avoid premature gelation. Without the use of a dispersing agent for the edible gum or for the calcium ion source, the gum and calcium tend to react rapidly because they are not coated by the dispersing agent. The use of lower amounts of calcium lower the risk of lumping. Additionally, the high shear mixing breaks up any lumps which may form. Generally, the higher the amount of the edible gum, the lower the amount of calcium ion source needed to set the gel into the firm, grindable, rubbery mass within a given period of time. Generally, weight ratios of sodium alginate/edible calcium ion source in the range of about 1 to about 3 have been found to provide firm, grindable, elastic or rubbery gels within acceptable commercial scale processing times of less than about 24 hours. At sodium alginate to calcium ion source weight ratios above about 3, the compositions tend to possess a jam-type or pastry filler-type spreadable consistency over prolonged periods of time.

The rate of gelation may also be controlled by the use of known edible pH adjusters, such as buffering systems, organic acids, acidic salts and alkaline salts. The pH controllers inhibit or promote reaction between the calcium ion source and the edible gum by controlling the solubility of the calcium ion source in the edible viscous liquid. Generally, lowering the pH increases the solubility of the calcium ion source which promotes its reaction with the edible gum. Increasing the pH generally decreases the solubility of the calcium ion source or sequesters the calcium ion which inhibits reaction with the edible gum.

Exemplary of suitable alkaline salts are sodium citrate, sodium acetate, and sodium ascorbate. A suitable acidic salt is sodium acid pyrophosphate. Suitable organic acids include citric acid, acetic acid, malic acid, fumaric acid, ascorbic acid, and the like. Exemplary of suitable buffering systems are sodium citrate and citric acid, sodium acetate and acetic acid, and sodium ascorbate and ascorbic acid. Before addition to the edible viscous liquid, the pH adjuster is preferably dissolved in an amount of water and/or in an amount of the edible viscous liquid which is sufficient to form a solution.

The amount of organic acid, acidic salt, or buffering system added is generally sufficient to provide a pH of about 3.5 to about 7.5, preferably about 4.5 to about 6.5 to increase the solubility of the calcium ion source subsequently added. Higher pH values, obtained with an appropriate amount of an alkaline salt, are generally used to impede the reaction between the calcium ion source and the edible gum.

The pH adjuster is thoroughly dispersed in the edible viscous liquid, followed by dispersion of the edible gum and then the calcium ion source. When an alkaline salt is used to inhibit the reaction between the calcium ion and the edible gum, it can be subsequently promoted by the addition of an edible organic acid, a buffer system or an acidic salt. The subsequently added acidic agent is preferably added in an amount of water and/or edible viscous liquid sufficient to solubilize it. The amount of acidic agent should again generally be sufficient to provide a pH of about 3.5 to about 7.5, preferably about 4.5 to about 6.5. Upon its addition, mixing is continued to obtain a substantially homogeneous mixture.

While pH adjusters can be used in the practice of the present invention, they are note preferred because they unnecessarily complicate commercial scale operations.

Another method for avoiding the formation of lumps upon the addition of either the calcium ion source or an edible gum which may have a relatively high calcium ion content is by the use of dispersing agents as disclosed in applicants' parent application U.S. Ser. No. 293,924 now U.S. Pat. No. 4,444,799. The dispersing agent can be for the edible gum and/or for the edible calcium ion source.

Commercially available edible gums, such as sodium alginate, may inherently contain calcium ions. When added in powdered form to an edible viscous liquid, such as corn syrup, lumps tend to form which are difficult to disperse. These lumps are believed to be caused by skin formation due to reaction of the calcium ions with the sodium alginate and the water present in the edible viscous liquid. Once this skin is formed, subsequent reaction between the interior, unreacted sodium alginate and the subsequently added calcium ion source can require prolonged mixing times under low shear mixing conditions. By first dispersing the edible gum in a dispersing agent and then admixing the dispersion with the edible viscous liquid, as disclosed in said parent application U.S. Ser. No. 293,924, now U.S. Pat. No. 4,444,799 the edible gum can be dispersed throughout the edible viscous liquid without forming lumps due to reaction with the water.

Likewise, the addition of the calcium ion source to the mixture of the edible viscous liquid and the edible gum tends to form lumps due to skin formation around the calcium ion source. This lumping is avoided by dispersing the calcium ion source in the dispersing agent which impedes reaction between the calcium ion source and the edible gum so as to permit its dispersion throughout the system in a manner which avoids lumping.

Under low shear mixing conditions, the edible dispersing agent for the gum, e.g., glycerine, can range from about 2 to about 7 or more parts by weight, based upon 100 parts by weight of the edible viscous liquid. It is used in an amount sufficient to disperse the gum in the viscous liquid. Lower amounts than about 2 might be capable of dispersing the gum. However, about 2 parts by weight have been generally found to be necessary for the dispersal. Once dispersed, additional amounts of the glycerine or other component can be used even though not necessary for dispersing the gum. Also, the amount of edible dispersing agent for the calcium salt sould be sufficient to slurry the calcium salt and can vary from about 0.5 to about 3 parts by weight, based upon 100 parts by weight of the edible viscous liquid.

The dispersing agent for the edible gum and the dispersing agent for the calcium ion source may be the same or different. The dispersing agent may be any edible liquid or edible solid that would not interact, or only interact very slowly with the other ingredients and still have the ability to disperse the edible gum and/or calcium ion source into the system. Exemplary of suitable liquid humectant dispersing agents are glycerine, sorbitol solutions, propylene glycol, and mixtures thereof. Exemplary of suitable solid humectant dispersing agents are crystalline sorbitol, sugar, and milk powder.

The edible dispersing agents may be used to adjust the water activity of the gel composition to values less than about 0.7. The edible dispersing agents may also be used to enhance the humectancy of the gels. Under high shear mixing conditions, a dispersing agent for the edible gum or for the edible calcium ion source is not needed to at least substantially avoid lumps in the final gelled product. Lump formation is minimized under high shear mixing conditions because of high fluid velocities across the entire surface of the edible viscous liquid and because of rapid agitation throughout substantially the entire mass of the edible viscous liquid. The dispersing agents may be used to delay or retard gelation times and/or for their affect on water activity and humectancy of the gel. Suitable amounts of the dispersing agent for the edible gum range up to about 10 parts by weight based upon the weight of the edible viscous liquid. Suitable amounts of the dispersing agent for the edible calcium ion source range up to about 10 parts by weight based upon 100 parts by weight of the edible viscous liquid. The total amount of humectant dispersing agent or agents is suitably less than about 20 parts by weight based upon 100 parts by weight of the edible viscous liquid. Higher amounts tend to increase costs excessively, or may impart undesirable tastes to the baked good.

The optional antimicrobial agents or anti-mycotics which can be included in the gels of the present invention are those known in the food art. Exemplary of suitable preservatives are sodium benzoate, benzoic acid, sorbic acid, calcium propionate, sodium propionate, potassium sorbate, calcium sorbate, and mixtures thereof. The preservatives can be used in effective amounts which do not adversely affect taste or smell of the final baked product or gellation rates. Suitable amounts range from about 0.0025% to about 0.30% by weight, based upon the weight of the gel composition. The optional preservative may be incorporated into the gel composition by adding it alone to the edible viscous liquid or as a premix with any of the other gel ingredients so as to distribute it substantially uniformly throughout the gel composition.

The firm gels of the present invention may include flavoring ingredients. However, they would tend to be released more slowly upon consumption. Incorporation of flavoring ingredients directly into the dough would provide for conventional flavor and textural impact. Additionally, incorporation of flavoring or other materials into the gel would unnecessarily increase the volume of the gelled ingredients in the baked goods and unnecessarily complicate the production of the firm gels. Accordingly, the firm gels of the present invention preferably only contain the edible viscous liquid, the edible gum, the calcium ion source, and the optional edible humectant dispersing agent or agents.

The firm gel composition is very easily prepared by first blending, either by low or high shear mixing, the edible gum with the optional humectant, dispersing agent for the gum to a thick, syrup-like, lump-free consistency. The resulting substantially uniform blend is then mixed into the edible viscous syrup, under high shear mixing conditions, for sufficient time to provide a lump-free, uniform blend. Typical high shear mixing times to obtain the uniform, lump-free blend range from about 1 minute to about 3 minutes. The edible calcium salt and the optional edible humectant, dispersing agent for the calcium salt are blended either by low shear or high shear mixing to form a pourable, lump-free slurry or blend. The resulting substantially uniform slurry or blend is mixed into the blend of the viscous liquid, gum, and gum dispersing agent, under high shear mixing conditions until a uniform, lump-free dispersion is obtained. Typical mixing times to obtain a uniform, lump-free dispersion typically range from about 1 to about 3 minutes. The addition of all components should preferably be performed while the edible viscous liquid is subjected to high shear mixing. This reduces processing times and further assures both the substantial avoidance of lump formation upon contact of the component with the edible viscous liquid, and the attainment of a consistent product from batch to batch.

In preparing gel compositions without a dispersing agent for the edible gum or for the calcium ion source, the edible viscous liquid is preferably first subjected to high shear mixing, and the edible gum and the edible calcium ion source are preferably sequentially added to the agitated edible viscous liquid. Addition of the edible gum prior to addition of the calcium ion source is preferred for avoidance of rapid, localized gelation of the gum. Dry or powdered edible gums and edible calcium ion sources can be preblended prior to addition to the edible viscous liquid. However, more consistent products are obtained from batch to batch when sequential addition is used. Each component, upon addition, is admixed with the other components for a period of time sufficient to achieve a substantially homogeneous, lump-free mixture. Typical mixing times range from about 1 to 3 minutes for each component added.

External heating or cooling is not needed in preparing the gel compositions of the present invention. Conveniently, the gels are prepared under ambient conditions with the ingredients being heated only by the heat generated during high shear mixing. Generally, mixing temperatures range from about 65° up to about 85° F.

Suitable low shear mixers which can be used for preblending of ingredients, such as the edible calcium ion source and the dispersing agent for it, include Hobart mixers, Sigma Blade mixers, Ribbon mixers, Nauta mixers, and Littleford mixers.

The high shear mixer should be capable of imparting the needed energy to at least substantially avoid the initial formation of lumps due to skin formation or premature gelling by intense rapid dispersion of the components into the edible viscous liquid. Suitable high shear mixing devices are those which can subject at least two-thirds, preferably at least substantially all of the gel ingredients, to a forced vortex. In an forced vortex, the surfaces of constant pressure are paraboloids of revolution. Suitable high shear mixing equipment which can be used in the present invention are Waring blenders, Norman mixers, a Breddo Likwifier, manufactured by Breddo Food Products Corporation, Kansas City, Kans., and vessels equipped with high speed impellers.

After mixing of all of the components is completed, the resulting mixture is poured into containers which are then sealed and the mixture is allowed to set. After it has set the containers can be stacked and stored or shipped. At some later point the firm gel can be used in the preparation of a cookie or cake dough or batter. The firm gels are capable of being ground into rubbery elastic pieces typically in about 12 to 24 hours after the completion of the high shear mixing. The firm gels are grindable into pieces at ambient bakery conditions which typically are about 65° F. to about 85° F. They remain grindable into rubbery, elastic pieces for periods of up to at least about six months.

Grinding of the firm gels of the present invention shortly before incorporation into a baked good dough avoids coagulation between the pieces. Pre-ground gels tend to form a solid mass under normal shipping and storage conditions. Suitable grinders for grinding of the firm gels of the present invention into rubbery, elastic pieces include low shear grinding equipment such as Hobart grinders, a food chopper, and the like.

Grinding of the gel into pieces facilitates incorporation of the gel into the baked good dough. The pieces to which the gel is ground should be of sufficient fineness to permit their dispersion or incorporation into the dough substantially uniformly using conventional dough mixing equipment. The firm grindable gels may be incorporated into the dough without pre-grinding. However, longer mixing times would be needed to disperse the firm gel substantially uniformly throughout the dough. The firm gels are suitably ground into pieces having a maximum dimension of about 1/16" to about ⅛" or less prior to incorporation into the dough. Additional size reduction generally occurs upon incorporation of the pieces into the dough. The pieces should be of sufficiently small size and sufficient elasticity so as to be nondiscernible upon consumption of the baked good.

A typical dough for making soft cookies, snacks and cakes can contain flour, granulated sugar and/or at least one syrup sweetener such as corn syrup, invert syrup, high fructose corn syrup, sucrose syrup, honey or molasses, shortening, leavening agent such as baking powder, and water. The flour may be wheat, oat, rice, potato, corn flour, mixtures thereof, and the like. Wheat is generally the preferred flour.

The amounts of these ingredients can vary over a very wide range depending upon the end product desired and the particular processing steps to be utilized. Based on 100 pounds of flour, the amount of sweetener, e.g., sugar, corn syrup, invert syrup, high fructose corn syrup, sucrose syrup, honey, molasses, or mixtures thereof can vary from 25 to 150 pounds depending upon the sweetness desired in the final product. In the sweetener composition, the granulated sugar can vary from zero to 150 pounds and the corn syrup, invert syrup, high fructose corn syrup, sucrose syrup, molasses or honey can vary from zero to 150 pounds. The amount of shortening can be varied from zero, preferably from about 20, to about 80 pounds per 100 pounds of flour. The amount of leavening agent, such as baking powder, present can vary from none up to about 5 pounds per 100 pounds of flour. When no baking powder is used, air can be whipped into the dough or batter during creaming.

Water can be added up to the desired amount keeping in mind that the flour normally contains about 12-14% by weight moisture, the invert syrup or high fructose syrup contains about 18 or more weight percent water and the firm gel typically contains about 15% to about 35% by weight water. Considering all sources including separately added water, the moisture content of the dough composition can range from 20 to 60% by weight. Sufficient water should be present to provide the desired consistency to the dough to enable proper working and shaping of the dough.

The doughs of the present invention contain from about 2% by weight to about 50% by weight of the firm gel composition, based upon the weight of the dough.

Depending upon the type of soft cookie or snack desired, the formulation could, of course, contain cocoa, chocolate, chocolate chips, oats, peanut butter, eggs, milk, raisins, nuts, artificial and/or natural flavoring or a variety of other ingredients normally used in the making of cookies or cakes, all in accordance with techniques well known in the art.

Preblending the firm gel with sugar and/or the at least one syrup sweetener enhances or facilitates its dispersion throughout the dough. It also at least substantially avoids the formation of undesirable lumps of gel in the dough. When granulated sugar is employed the firm gel can be mixed with the granulated sugar until the firm gel forms beadlets. A low shear mixer, such as a Hobart mixer, can be used to form the beadlets. Alternatively, the firm gel can be ground, in a food chopper for example, and then blended with the granulated sugar.

When granulated sugar is not employed, the firm gel is preferably ground prior to blending with the at least one syrup sweetener. The ground gel can be mixed directly with the at least one syrup, such as invert syrup, and/or high fructose corn syrup, the shortening, and the water.

When both granulated sugar and at least one syrup sweetener are used, it is preferable to pre-blend the firm gel with the granulated sugar and then combine the pre-blend with the at least one syrup sweetener, the shortening, and the water.

In the event no invert syrup or other sweetening syrup is used, the firm gel is mixed with the granulated sugar to disperse it on the sugar in the form of beadlets and the resulting blend is mixed with the shortening and water.

After combining the firm gel, the at least one sweetener, the shortening, and the water, mixing is continued until a smooth consistency is obtained. Thereafter, the flour and leavening agent, such as baking powder, are added to the creamed mixture and mixing is continued to form a smooth dough.

The dough is cut or otherwise shaped into the form and size of cookie or snack desired in a conventional manner and then is baked by conventional procedures. Baking temperatures of about 325° F. to about 450° F. can be used. The higher temperatures will require less time for baking a given form of dough. For example, for cookies the time can be as low as six minutes and for cakes about eighteen or twenty minutes might be needed. The times and temperatures are conventional and the skilled baker can utilize any suitable times and temperatures consistent with good baking practices. The final baked product preferably has a water activity of less than about 0.7 to assure the attainment of microbial stability for periods of at least six months under non-refrigerated conditions.

The doughs may be used to produce soft textured drop-cookies, sandwich type cookies, filled cookies, and the like, or multiple textured cookies of extended shelf life. The latter type of cookies can be produced by enrobing one dough with another dough, the two doughs having substantially different amounts of gel. The outer dough may be a conventional crispy cookie dough without any of the firm gel of the present invention.

As employed in the context of the present invention, the term "chewy" is intended to define textures which possess a discernible degree of plasticity. Chewiness also connotes impressions of softness and moistness. Crispness and chewiness can be described in terms of taste panel tests which take as standards the texture of fresh saltine crackers having a moisture content of about 2% (rating of 0) and a freshly baked cookie having a distinctly chewy texture throughout (rating of 10): i.e., chewy cookies prepared in accordance with the following recipe:

⅔ c. sugar
¼ c. butter or regular margarine
1 tsp. ground ginger
½ tsp. ground cinnamon
½ tsp. baking soda
½ tsp. salt
½ tsp. vanilla
1 egg
½ c. honey
1½ c. sifted flour The cookies are prepared by combining ⅔ cup of sugar, butter, ginger, cinnamon, bakng soda, salt and vanilla in a large mixing bowl and creaming the ingredients until they are light and fluffy. Next the eggs are added and beat in until the mixture is very fluffy. The honey is then blended in, followed by the blending in of the flour a little at a time. The dough is dropped by teaspoonfuls 2½ inches apart onto a lightly greased baking sheet, baked at 350° F. for 10 to 15 minutes until lightly browned and removed at once from the baking sheet to racks to cool thoroughly.

Employing the rating scale described above, the chewy portion of the product of this invention preferably has a rating of at least 3 and most preferably at least 5. The crispy portion preferably has a rating of less than 5 and most preferably less than 2. The regions should show a difference in ratings of at least 2 units, and most preferably at least 5 units.

A suitable crispy cookie dough comprises, based upon 100 pounds of flour: (a) from about 25 to about 150 pounds of granulated sugar, (b) from 0, preferably from about 20 to about 80 pounds shortening, and (c) from 0 up to about 5 pounds of a leavening agent such as sodium bicarbonate. The crispy dough should also contain water in an amount sufficient to provide desired consistency to the dough and to enable proper working and shaping. Conventional cookie flavoring and texturizing ingredients can be included in conventional amounts and in known manner.

The present invention is further illustrated in the following examples, where all parts, ratios, and percentages are by weight, and all temperatures are in °F., unless otherwise stated:

EXAMPLE 1

| Formulation of the Firm Gel System or Dough Conditioner | |
|---|---|
| Component | Parts by Weight on A Parts Per Hundred Parts HFCS Basis |
| High Fructose Corn Syrup (about 72% solids, 42% fructose, 50% dextrose) | 100 |
| Glycerine | 3 |
| Sodium Alginate Gum* | 1.25 |
| Calcium Sulfate Dihydrate | 1.25 |
| Propylene Glycol | 1 |

*Kelcogel HV, a medium viscosity (1% aqueous solution has a viscosity of about 400 cps at 25° C.), regular mesh (approximately 80 mesh), low calcium sodium alginate (9.4% sodium, 0.2% calcium) sold by Kelco Division Merck & Co., Inc., Clark, New Jersey

Mixing Procedure

The corn syrup is added to a Norman high shear mixer at approximately 70° F. The sodium alginate gum and glycerine are pre-mixed in a Hobart mixer to a thick, syrup-like, lump-free consistency. The calcium sulfate dihydrate and propylene glycol are also pre-mixed or blended to a pourable, lump-free slurry in a Hobart mixer. The corn syrup is subjected to high shear mixing and the alginate/glycerine blend is then added to, and mixed with, the corn syrup in the mixer for about 2 minutes. The calcium sulfate slurry is then added to the agitated corn syrup and mixing is continued for about 1 more minute. During the high shear mixing, the vortex extends to a depth so as to make the mixing blade at the bottom of the vessel visible. Upon completion of the mixing, the contents of the vessel are poured directly into plastic-lined shippers or containers which are properly sealed whereupon the mixture is allowed to gel and set. The gelled mixtures in the containers are then stacked and stored or shipped. The firm gel can be used thereafter in a baking step for making soft-textured cookies (described hereinafter) or held for some time and then distributed to the baking location or baking plant.

EXAMPLE 2

| Making Soft Cookies With Extended Shelf-Life Utilizing the Firm Gel System of Example 1 Above | |
|---|---|
| 1. Formulation | Lb. |
| Wheat Flour (Bread Type) | 100 |
| Sugar, Granulated | 40 |
| High Fructose Corn Syrup | 10 |
| Shortening, Hydrogenated | 30 |
| Firm Gel System (Example 1) | 25 |
| Baking Powder | 1.5 |
| Water | 10 |
| | 216.5 |

2. Mixing and Baking Procedure

The firm gel system is dispersed on the granulated sugar and mixed until the firm gel is in the form of beadlets (approximately 1/32" diameter). Then, to the above, are added, with mixing, the high fructose corn syrup, the shortening and water and mixing is continued until a smooth consistency is obtained. Then, the flour and baking powder are added to he above and mixed to form a smooth dough. The dough is cut or otherwise formed into the size cookie or snack desired and then baked at a temperature ranging from about 325° F. to about 450° F. for about 6 minutes to about 18 or 20 minutes. The cookies resulting from the formulation, mixing procedure and baking have an extended shelf-life of at least 6 months while retaining a moist and soft texture.

EXAMPLE 3

The ingredients used to produce a firm, grindable sucrose gel are:

| Component | Parts by Weight on a Parts Per Hundred Parts Sucrose Syrup Basis |
|---|---|
| Sucrose Syrup (about 67% by weight solids) | 100 |

-continued

| Component | Parts by Weight on a Parts Per Hundred Parts Sucrose Syrup Basis |
|---|---|
| Glycerine | 6 |
| Propylene Glycol | 2 |
| Sodium Alginate Gum* | 1.25 |
| Calcium Sulfate Dihydrate | 1.25 |

*Kelcogel LV, a low viscosity (1% aqueous solution has a viscosity of about 50 cps at 25° C.), fine mesh (approximately 150 mesh) low calcium sodium alginate (about 9.4% sodium, 0.2% calcium) sold by Kelco Division Merck & Co., Inc., Clark, NJ The sucrose syrup is added to a Norman high shear mixer at approximately 70° F. The glycerine and the propylene glycol are mixed together in a Hobart mixer to form a substantially homogeneous humectant dispersing agent mixture. The sodium alginate gum and half of the dispersing agent mixture are premixed in a Hobart blender to a substantially lump free consistency. The calcium sulfate dihydrate is premixed with the remaining half of the humectant dispersing agent mixture in a Hobart mixer to form a pourable, lump free slurry. The sucrose syrup is subjected to high shear mixing and the alginate mixture is added to, and mixed with, the sucrose syrup in the mixer for about 2 minutes. The calcium sulfate slurry is then added to the mixer, with the mixer running, and mixing is continued for about 1 more minute. During the high shear mixing, the vortex extends to a depth so as to make the mixing blade at the bottom of the vessel visible. Upon completion of the mixing, the contents of the vessel are poured directly into plastic-lined shippers or containers which are properly sealed whereupon the mixture is allowed to gel and set.

EXAMPLE 4

The ingredients used to produce a firm, grindable sucrose-based gel are:

| Component | Parts by Weight Per 100 Parts by Weight Edible Viscous Liquid |
|---|---|
| Sucrose Syrup (about 67% by weight solids) | 90 |
| High fructose corn syrup (about 72% solids, 42% fructose, 50% dextrose) | 10 |
| Sodium Alginate Gel* | 1.14 |
| Calcium Sulfate | 0.57 |

*Kelcogel LV sold by Kelco Division Merck & Co., Inc., Clark, NJ.

The sucrose syrup and high fructose corn syrup are added to a Norman high shear mixer at approximately 70° F. The mixer is turned on, the sodium alginate gum is added to the agitated syrup and mixing is continued for 2 minutes. The calcium sulfate is then added to the mixer, with the mixer running and mixing is continued for 1 minute. During the mixing, the vortex extends to a depth so as to make the agitator blade at the bottom of the vessel visible. Upon completion of the mixing, the contents of the vessel are poured directly into plastic-lined shippers or containers which are properly sealed whereupon the mixture is allowed to gel and set.

EXAMPLE 5

The ingredients and procedure used to produce a firm, grindable sucrose-based gel are the same as in Example 4 except 10 parts by weight of honey are substituted for the 10 parts by weight of high fructose corn syrup of Example 4.

EXAMPLE 6

The ingredients and procedure used to produce a firm, grindable sucrose-based gel are the same as in Example 4 except 10 parts by weight of molasses are substituted for the 10 parts by weight of high fructose corn syrup of Example 4.

EXAMPLE 7

A cookie dough for producing soft cookies with extended shelf life is made with:

| Ingredient | Amount Based Upon 100 lbs Flour |
|---|---|
| Wheat Flour | 100 |
| Sugar, granulated | 40 |
| Shortening | 30 |
| Firm Sucrose Gel of Example 3 | 35 |
| Baking Powder | 1.5 |
| Water | 10 |

The firm sucrose gel is ground into pieces having a maximum dimension of about ⅛" or less using a food chopper. The ground gel is blended with the granulated sugar in a Hobart mixer to obtain a substantially homogeneous preblend comprising gel beadlets of approximately 1/32" diameter. The preblend is admixed with the shortening and water to obtain a creamed mixture of smooth consistency. The flour and baking soda are admixed with the creamed mixture to form a smooth dough. The dough is formed into pieces and baked as in Example 2.

EXAMPLE 8

The ingredients and procedure used to produce soft cookies are the same as in Example 7 except the firm sucrose/high fructose corn syrup gel of Example 4 is substituted for the firm sucrose gel.

EXAMPLE 9

The ingredients and procedure used to produce soft cookies are the same as in Example 7 except the firm sucrose/honey gel is substituted for the firm sucrose gel.

EXAMPLE 10

Multitextured cookies are produced by enrobing the soft cookie doughs of Examples 7 and 8, respectively, in a conventional crispy cookie dough having a formulation based upon 100 pounds of flour, of 50 pounds granulated sugar, 30 pounds hydrogenated shortening, 1.5 pounds baking powder, and 10 pounds of water. The dual dough pieces are baked as in Example 2 to obtain cookies which are soft and chewy on the inside and crunchy on the outside.

EXAMPLE 11

Multitextured cookies are produced as in Example 10 except that in the soft cookie doughs of Examples 7 and 8, the 10 pounds of high fructose corn syrup is replaced by 10 pounds of the firm sucrose gel system of Example 3 to provide a total of 35 pounds of firm gel per 100 pounds of flour in the soft dough.

EXAMPLE 12

The ingredients and their relative amounts used to make a firm, grindable high fructose corn syrup gel are:

| Component | Parts by Weight Per 100 Parts HFCS |
|---|---|
| High Fructose Corn Syrup (about 72% solids, 42% fructose, 50% dextrose) | 100 |
| Aqueous Ascorbic Acid (10% by weight) | 0.34 |
| Sodium Alginate Gum* | 1 |
| Dicalcium Phosphate Dihydrate | 1 |

*Keltone, a medium viscosity (1% aqueous solution has a viscosity of about 400 cps at 25° C.), fine mesh (approximately 150 mesh), low calcium sodium alginate (about 9.4% sodium and 0.2% calcium), sold by Kelco Division, Merck & Co., Clark, NJ The high fructose corn syrup is added to a Norman high shear mixer at approximately 70° F. The aqueous ascorbic acid is added to the mixer and mixed with the HFCS for ½ minute. With the mixer running, the sodium alginate gum is slowly added over ½ minute and then the dicalcium phosphate dihydrate is slowly added over ½ minute. The mixing is continued for 2 minutes. During the high shear mixing, the vortex extends to a depth so as to make the mixing blade at the bottom of the vessel visible. Upon completion of the mixing, the contents of the vessel are poured directly into plastic-lined shippers or containers which are properly sealed whereupon the mixture is allowed to gel and set.

EXAMPLE 13

The ingredients and their relative amounts used to make a firm, grindable high fructose corn syrup gel are:

| Component | Parts by Weight Per 100 Parts HFCS |
|---|---|
| High Fructose Corn Syrup (about 72% solids, 42% fructose, 50% dextrose) | 100 |
| Buffer System (22% aqueous sodium citrate/citric acid solution, 6:1 ratio of salt to acid) | 0.32 |
| Sodium alginate gum* | 1 |
| Dicalcium Phosphate Dihydrate | 1 |

*Keltone, a medium viscosity, fine mesh, low calcium sodium alginate, sold by Kelco Division, Merck & Co., Clark, NJ.

EXAMPLE 14

The ingredients and their relative amounts used to make a firm, grindable high fructose corn syrup gel are:

| Component | Parts by Weight Per 100 Parts HFCS |
|---|---|
| High Fructose Corn Syrup (about 72% solids, 42% fructose, 50% dextrose) | 100 |
| Sodium Acid Pyrophosphate | 0.06 |
| Dicalcium Phosphate Dihydrate | 0.56 |
| Sodium Alginate Gum* | 0.56 |

*Keltone, a medium viscosity, fine mesh, low calcium sodium alginate, sold by Kelco Division, Merck & Co., Clark, NJ.

The high fructose corn syrup is added to a Norman high shear mixer at approximately 70° F. The dry ingredients are preblended in a Hobart mixer. The Norman mixer is turned on and the preblend is added to the vortexing high fructose corn syrup. Mixing is continued for 2 minutes. During the mixing, the vortex extends to a depth so as to make the mixing blade at the bottom of the vessel visible. Upon completion of the mixing, the contents of the vessel are poured directly into plastic-lined shippers or containers which are properly sealed whereupon the mixture is allowed to gel and set.

EXAMPLE 15

The ingredients and their relative amounts used to make a firm, grindable high fructose corn syrup gel are:

| Component | Parts by Weight Per 100 Parts HFCS |
|---|---|
| High Fructose Corn Syrup (about 72% solids, 42% fructose, 50% dextrose) | 100 |
| Aqueous Sodium Citrate (33% by weight) | 0.19 |
| Sodium Alginate Gum* | 0.87 |
| Dicalcium Phosphate Dihydrate | 0.35 |
| Aqueous Citric Acid Solution (33% by weight) | 0.19 |

*Keltone, a medium viscosity, fine mesh, low calcium sodium alginate, sold by Kelco Division, Merck & Co., Clark, NJ The citric acid solution is premixed with about 1 part by weight of the high fructose corn syrup to form a citric acid blend. The remaining HFCS is added to a Norman high shear mixer at about 70° F. The mixer is turned on and the aqueous sodium citrate is added to the vortexing HFCS. After 1 minute of mixing, to thoroughly admix the sodium citrate solution and the HFCS, the sodium alginate, dicalcium phosphate dihydrate, and the citric acid blend are sequentially added with the mixer running. Each component is mixed in for 1 minute to thoroughly disperse it in the vortexing mixture. During the mixing, the vortex extends to a depth so as to make the mixing blade at the bottom of the vessel visible. Upon completion of the mixing, the contents of the vessel are poured directly into plastic-lined shippers or containers which are properly sealed whereupon the mixture is allowed to gel and set.

EXAMPLE 16

The ingredients and their relative amounts used to make a firm, grindable high fructose corn syrup gel are:

| Component | Parts by Weight Per 100 Parts HFCS |
|---|---|
| High Fructose Corn Syrup (about 72% | 100 |

| Component | Parts by Weight Per 100 Parts HFCS |
|---|---|
| solids, 42% fructose, 50% dextrose) | |
| Buffer system (22% aqueous sodium citrate/citric acid solution, 10:1 ratio of salt to acid) | 0.32 |
| Sodium Alginate* | 0.88 |
| Dicalcium Phosphate Dihydrate | 0.35 |

*Keltone, a medium viscosity, fine mesh, low calcium sodium alginate, sold by Kelco Division, Merck & Co., Clark, NJ.

The high fructose corn syrup is added to a Norman high shear mixer at about 70° F. The mixer is turned on and the buffer system is added to the vortexing HFCS. After 1 minute of mixing to thoroughly admix the buffer system and the HFCS, the sodium alginate is added with the mixer running and mixing is continued for 1 minute. Then, the calcium phosphate dihydrate is added to the vortexing mixture and mixing is continued for 2 minutes. During the mixing, the vortex extends to a depth so as to make the mixing blade at the bottom of the vessel visible. Upon completion of the mixing, the contents of the vessel are poured directly into plastic-lined shippers or containers which are properly sealed whereupon the mixture is allowed to gel and set.

EXAMPLE 17

The ingredients and their relative amounts used to make a firm, grindable high fructose corn syrup gel are:

| Component | Parts by Weight Per 100 Parts HFCS |
|---|---|
| High Fructose Corn Syrup (about 72% solids, 42% fructose, 50% dextrose) | 100 |
| Sodium Alginate Gum* | 0.75 |
| Dicalcium Phosphate Dihydrate | 0.25 |

*Keltone, a medium viscosity, fine mesh, low calcium sodium alginate, sold by Kelco Division, Merck & Co., Clark, NJ.

The high fructose corn syrup is added to a Norman high shear mixer at approximately 70° F. The mixer is turned on and the sodium alginate and the dicalcium phosphate dihydrate are sequentially added to the vortexing HFCS and the mixing is continued for 3 minutes. During the mixing, the vortex extends to a depth so as to make the mixing blade at the bottom of the vessel visible. Upon completion of the mixing, the contents of the vessel are poured directly into plastic-lined shippers or containers which are properly sealed whereupon the mixture is allowed to gel and set.

What is claimed is:

1. A method for making an edible firm gel composition capable of being ground for producing soft-textured baked products from a dough, comprising mixing:
   (a) an edible viscous liquid;
   (b) from about 0.25 to about 4 parts by weight of an edible gum capable of being set by calcium ions, and
   (c) from about 0.1 to about 4 parts by weight of a calcium ion source for setting said gum,
said parts by weight being based upon 100 parts by weight of said edible viscous liquid, said mixing being under mixing conditions to substantially avoid the initial formation of lumps and to form a substantially homogeneous, lump-free blend.

2. A method as claimed in claim 1 wherein the edible viscous liquid is mixed, and the edible gum and edible calcium ion source are added to said edible viscous liquid.

3. A method as claimed in claim 2 wherein the edible gum is added to said edible viscous liquid prior to addition of the edible calcium ion source to said edible viscous liquid.

4. A method as claimed in claim 1 wherein said edible gum is preblended with an edible humectant dispersing agent to form a substantially uniform lump-free blend which is mixed with said edible viscous liquid.

5. A method as claimed in claim 4 wherein said edible calcium ion source is preblended with an edible humectant dispersing agent to form a substantially uniform slurry which is mixed with said edible viscous liquid.

6. A method as claimed in claim 5 wherein the edible humectant dispersing agent for said gum is glycerine and the edible humectant dispersing agent for said calcium ion source is propylene glycol.

7. A method as claimed in claim 5 wherein said dispersing agents are the same, and said uniform blend is mixed with said edible viscous liquid and then said slurry is mixed with said edible viscous liquid.

8. A method as claimed in claim 7 wherein the dispersing agent is a mixture of glycerine and propylene glycol.

9. A method as claimed in claim 1 wherein the edible viscous liquid is at least one member selected from the group consisting of corn syrup, high fructose corn syrup, and sucrose syrup.

10. A method as claimed in claim 9 wherein said edible gum is an alginate.

11. A method as claimed in claim 10 wherein said edible calcium ion source is calcium monohydrogen phosphate dihydrate or calcium sulfate dihydrate.

12. A method as claimed in claim 1 wherein said edible gum and said edible calcium ion source is calcium alginate.

13. An edible firm gel composition capable of being ground for producing soft-textured baked products from a dough, said gel composition being obtained by the method of claim 1.

14. An edible firm gel composition capable of being ground for producing soft-textured baked products from a dough, said gel composition comprising a firm gel formed from a mixture or blend of:
   (a) an edible viscous liquid;
   (b) from about 0.25 to about 4 parts by weight of an edible gum capable of being set by calcium ions, and
   (c) from about 0.1 to about 4 parts by weight of a calcium ion source for setting said gum,
said parts by wegiht being based upon 100 parts by weight of said edible viscous liquid, the water content of said gel composition being from about 15% to about 35% by weight, based upon the weight of said gel composition.

15. A composition as claimed in claim 14 wherein the edible viscous liquid is corn syrup, high fructose corn syrup, sucrose syrup, or mixtures thereof.

16. A composition as claimed in claim 15 wherein said edible gum is an alginate.

17. A composition as claimed in claim 16 wherein said edible calcium ion source is calcium monohydrogen phosphate dihydrate or calcium sulfate dihydrate.

18. A composition as claimed in claim 14 wherein said mixture or blend consists essentially of said edible viscous liquid, said edible gum, and said calcium ion source.

19. A composition as claimed in claim 14 wherein said mixture or blend further comprises at least one edible humectant dispersing agent, the total amount of said dispersing agent being less than about 20 parts by weight of the edible viscous liquid.

20. A composition as claimed in claim 19 wherein said at least one dispersing agent is glycerine, propylene glycol or mixtures thereof.

21. A composition as claimed in claim 14 wherein the amount of said calcium ion source is from about 0.25 to about 1.0 parts by weight and the amount of said edible gum is from about 0.5 to about 1.5 parts by weight, based upon 100 parts by weight of the edible viscous liquid.

22. A composition as claimed in claim 14 wherein said edible viscous liquid is a mixture of high fructose corn syrup and sucrose syrup.

23. A composition as claimed in claim 14 wherein said edible viscous liquid is sucrose syrup.

24. A composition as claimed in claim 14 wherein the weight ratio of said gum to said calcium ion source is from about 1 to about 3.

25. A soft cookie or snack dough composition containing about 2 to about 50 weight percent of the gel composition claimed in claim 14.

26. Baked products having a moist, soft texture and an extended shelf life prepared by shaping and baking the dough composition claimed in claim 25.

27. The dough composition of claim 25, wherein the gel contained in said dough composition is in beadlet or ground form.

28. A method of making dough for producing soft-textured baked products comprising grinding the firm gel composition of claim 14 and mixing the ground gel composition with dough ingredients including flour to form a dough of smooth consistency, the amount of said gel composition being about 2 to about 50 weight percent of said dough.

29. A method as claimed in claim 28 wherein said ground gel composition is admixed with at least one sweetener, shortening and water to obtain a substantially homogeneous mixture, and said mixture is admixed with said flour.

30. A method as claimed in claim 29 wherein said at least one sweetener comprises granulated sugar and at least one syrup sweetener, the ground gel is preblended with the granulated sugar, and the resulting mixture is admixed with the at least one syrup sweetener, the shortening, and water to form said substantially homogeneous mixture.

31. A method as claimed in claim 30 wherein said at least one syrup sweetener is high fructose corn syrup.

32. A method of making dough for producing soft-textured baked products comprising grinding the firm gel composition of claim 14, adding sweeteners, shortening and water and mixing until a smooth consistency results, and blending in flour and baking powder to form said dough.

33. A method of making dough for producing soft-textured baked products comprising mixing the firm gel composition of claim 14 with at least one sweetener to form a preblend, and mixing said preblend with dough ingredients including flour to form dough of smooth consistency, the amount of said gel composition being about 2 to about 50 weight percent of said dough.

34. A method as claimed in claim 33 wherein said at least one sweetener comprises granulated sugar.

35. A method as claimed in claim 34 wherein said preblend is combined with at least one syrup sweetener, shortening, and water to obtain a substantially homogeneous mixture, and said homogeneous mixture is admixed with said flour.

36. A method as claimed in claim 35 wherein said at least one syrup sweetener is high fructose corn syrup.

37. A method as claimed in claim 33 wherein said edible viscous liquid is a mixture of high fructose corn syrup and sucrose syrup.

38. A method as claimed in claim 33 wherein said edible viscous liquid is sucrose syrup.

39. A method as claimed in claim 33 wherein said edible viscous liquid is high fructose corn syrup.

40. A method as claimed in claim 34 wherein said preblend of firm gel and granulated sugar comprises gel beadlets.

41. A method of making dough for producing soft-textured baked products comprising premixing the edible firm gel composition of claim 14 with granulated sugar until beadlets form, adding sweeteners, shortening and water, and mixing until smooth consistency results, and blending in flour and baking powder to form said dough.

* * * * *